United States Patent
Cathcart et al.

(10) Patent No.: US 10,294,911 B2
(45) Date of Patent: May 21, 2019

(54) IGNITION CONTROL AND SYSTEM FOR AN ENGINE OF AN UNMANNED AERIAL VEHICLE (UAV)

(71) Applicant: Orbital Australia Pty Limited, Balcatta, Western Australia (AU)

(72) Inventors: Goeffrey Paul Cathcart, Mount Lawley (AU); Nicolass Harry Buters, Maylands (AU)

(73) Assignee: ORBITAL AUSTRALIA PTY LIMITED, Balcatta (AU)

( * ) Notice: Subject to any disclaimer, the term of this patent is extended or adjusted under 35 U.S.C. 154(b) by 77 days.

(21) Appl. No.: 15/319,368

(22) PCT Filed: Jun. 12, 2015

(86) PCT No.: PCT/AU2015/050327
§ 371 (c)(1),
(2) Date: Dec. 15, 2016

(87) PCT Pub. No.: WO2015/192177
PCT Pub. Date: Dec. 23, 2015

(65) Prior Publication Data
US 2017/0122282 A1    May 4, 2017

(30) Foreign Application Priority Data
Jun. 18, 2014   (AU) ................................ 2014902336

(51) Int. Cl.
*F02P 15/02* (2006.01)
*F02P 3/04* (2006.01)
(Continued)

(52) U.S. Cl.
CPC .............. *F02P 15/02* (2013.01); *F02C 7/266* (2013.01); *F02P 3/0407* (2013.01);
(Continued)

(58) Field of Classification Search
CPC .................................. F02P 15/02; F02B 23/08
See application file for complete search history.

(56) References Cited

U.S. PATENT DOCUMENTS

| 4,502,454 A | 3/1985 | Hamai et al. |
| 4,846,129 A * | 7/1989 | Noble ..................... F02P 5/152 123/406.14 |

(Continued)

FOREIGN PATENT DOCUMENTS

| EP | 1013924 | 6/2000 |
| WO | 1990/013742 | 11/1990 |
| WO | WO 91/01448 | 2/1991 |

OTHER PUBLICATIONS

International Search Report issued in corresponding International Application No. PCT/AU2015/050327 dated Jul. 14, 2015.
(Continued)

*Primary Examiner* — Jess Whittington
(74) *Attorney, Agent, or Firm* — Hogan Lovells US LLP

(57) ABSTRACT

The ignition system (10) of an engine (particularly for a UAV) has a primary (10a), and a secondary (10b) ignition system to provide redundancy for 'get you home' capability should the primary ignition system fail. The secondary ignition provides a lower energy or shorter duration spark than the higher energy or longer duration sparking of the primary ignition system, and is retarded relative to primary sparking. Timing of the secondary sparking can be advanced in the event of primary sparking failure. Fuelling strategy can be shifted from a leaner stratified charge to a richer homogenous charge when relying just on the secondary ignition system for ignition. The secondary ignition system can be of a lower spark energy and/or duration than the primary ignition system, avoiding the cost, complexity and weight of replicating the primary ignition system, and to improve packaging within the engine housing, particularly within the limited payload and space limits of a UAV.

24 Claims, 2 Drawing Sheets

(51) Int. Cl.
  *F02P 3/08* (2006.01)
  *F02P 5/15* (2006.01)
  *F02P 9/00* (2006.01)
  *F02P 17/00* (2006.01)
  *F02P 15/08* (2006.01)
  *F02C 7/266* (2006.01)
  *F02D 41/22* (2006.01)

(52) U.S. Cl.
  CPC ........... *F02P 3/0807* (2013.01); *F02P 5/1502* (2013.01); *F02P 9/007* (2013.01); *F02P 15/08* (2013.01); *F02P 17/00* (2013.01); *F02D 2041/227* (2013.01); *F02D 2400/08* (2013.01); *Y02T 10/46* (2013.01)

(56) References Cited

U.S. PATENT DOCUMENTS

| | | | |
|---|---|---|---|
| 5,791,320 A | 8/1998 | Haban | |
| 6,357,427 B1 * | 3/2002 | Luttrelll | F02P 3/0456 123/609 |
| 6,405,708 B1 * | 6/2002 | Watson | F02B 75/243 123/406.6 |
| 2004/0094124 A1 * | 5/2004 | Viele | F02D 35/021 123/406.27 |
| 2006/0235601 A1 * | 10/2006 | Uruno | F02D 41/266 701/102 |
| 2011/0203551 A1 * | 8/2011 | Russ | F02D 41/0007 123/406.45 |
| 2013/0055984 A1 * | 3/2013 | Snell | F02B 43/10 123/25 R |
| 2013/0111914 A1 | 5/2013 | Kempinski | |
| 2014/0249694 A1 * | 9/2014 | Cathcart | B64D 31/06 701/2 |

OTHER PUBLICATIONS

International Preliminary Report and annexes issued in corresponding International Application No. PCT/AU2015/050327 dated May 17, 2016.

Supplementary European Search Report issued in European Patent Application No. 15809949.9, dated May 29, 2018.

\* cited by examiner

IGNITION CONTROL AND SYSTEM FOR AN ENGINE OF AN UNMANNED AERIAL VEHICLE (UAV)

FIELD OF THE INVENTION

The present invention relates to ignition control and ignition systems for engines used in unmanned aerial vehicles.

The present invention is particularly applicable to redundancy in ignition control and ignition systems for UAV engines using heavy fuels.

BACKGROUND TO THE INVENTION

Unmanned aerial vehicles (UAVs) require range and durability in the air. To help achieve this, engines and their control systems need to be relatively light in weight and yet provide high performance.

One way to achieve lightness in weight is to omit as many non-essential components and control systems as possible and/or make such components lightweight. However, to survive in the extreme ambient conditions that UAVs are exposed to, the engine and its control systems also need to be robust and reliable.

The ignition system is one essential engine control system. Without an ignition system the UAV engine will not start or continue to run.

Minimising components in the ignition system, particularly where this may impact on any redundancy capability, can however lead to an increased risk of engine failure, and ultimately potentially complete loss of the UAV.

UAVs need to be reliable because the consequences of mechanical or electrical failure (such as engine mechanical failure or engine sub-system failure e.g. the ignition system) can be very severe. If a UAV in some way fails whilst flying, it comes down to earth very quickly, often with catastrophic results in terms of the UAV crashing. Also, such failure can happen when the UAV is a long way from its base and potentially over dangerous or difficult terrain, making safe recovery risky or impossible. There is also the associated risk of losing very expensive surveillance or other equipment carried by the UAV.

The need for reliability becomes particularly crucial if UAVs are used in civilian areas where a failure could endanger human lives.

To maintain reliability, additional and/or more robust components can be used. However, this tends to lead directly to increased UAV weight. Robustness of components tends to require more material or features in order for the components to better withstand shock, vibration, extremes of temperature and changes in temperature. This need for robustness of components is all the more relevant for UAVs which have to cope with harsh environmental conditions experienced at high altitude for long periods of time.

Furthermore, in terms of reliability, having only one ignition system on-board does not allow for any failure at all of the ignition system. This may not satisfy certain regulatory requirements for such aerial vehicles when used in specific applications.

It would hence be beneficial to have full redundancy in the ignition system. This could obviously be achieved by duplicating the main ignition system. Duplication is readily achieved by having a secondary ignition system exactly replicating or mirroring the components and capability of the main ignition system.

A benefit of such duplication of the main ignition system is that components are exactly the same between the two systems, making spare parts and maintenance easier to manage.

Replicating the main ignition system with an entire ignition system of the same components will also enable full performance of the UAV to be maintained in order to complete a flight without returning to point of origin.

However, merely duplicating the primary ignition system can significantly impact desired weight (and often size) constraints of the UAV which can drastically reduce performance and range of the UAV.

A known system employing duplicated ignition systems is disclosed in U.S. Pat. No. 6,357,427. Multiple controllers are employed, each controller controlling operation of a spark plug and able to control the energy and timing of two spark plugs in the event of failure of one of the controllers. As suggested by the background section of U.S. Pat. No. 6,357,427, this system is aimed at relatively large, commercial aircraft with low speed, large cylinder engines (for example, 1.5 liters per cylinder) where the large spark plug gap at cold engine temperature start-up requires a higher energy than operating the engine at running temperature. U.S. Pat. No. 6,357,427 seeks to optimise ignition control, but in terms of redundancy in the ignition system, U.S. Pat. No. 6,357,427 seeks only to exactly replicate the components and capability of the controller and spark plug arrangement. Each controller operates exactly the same as another, with each spark plug receiving the same timing control signals and outputting the same energy as any other spark plug for given engine conditions. If one controller fails, the other controller acts as a back-up, providing the same functionality and having exactly the same capability as the failed controller.

Another known system where ignition system components are merely replicated is disclosed in US 2006/0235601. Disclosed is an aviation ignition system which is completely replicated in a back-up ignition system. Crank speed and cam timing sensors are replicated, as are individual CPUs, coils and spark plugs across primary and back-up ignition systems. The primary and back-up CPUs continuously 'talk' to each other, sharing ignition data, to ensure that if one system fails, the other exactly matches the ignition spark timing and energy of the other to ensure no change in engine operation. As with U.S. Pat. No. 6,357,427, directly replicating all of the components from the primary ignition system in the back-up ignition system adds considerable weight, cost and complexity that the present invention seeks to alleviate.

The aircraft engines and aircraft themselves, to which the systems of U.S. Pat. No. 6,357,427 and US 2006/0235601 are applicable, are of the type where the added weight, cost and complexity of exactly duplicated systems is of little or no concern. The capability of the secondary/back-up ignition system in these solutions exactly duplicates that of the primary ignition system. There has been no consideration in either solution of the need to reduce weight, complexity or functionality of the back-up ignition system.

For certain inductive coil ignition systems, the inductive coil has a heavy iron core which is required so that the coil can produce a spark with sufficient energy to initiate combustion. Adding a second inductive coil to provide redundancy capability for the ignition system of a UAV would hence add significant weight to the UAV. This is particularly true of spark ignition UAV engines running on heavy fuels, such as JP5 and JP8 where a robust coil is required to generate sufficient spark energy to initiate combustion of such heavy fuels.

Also, duplicating the primary ignition system significantly invariably adds to the cost of the UAV ignition system, not least because the primary ignition system components needing to be robust are therefore relatively expensive.

Whilst it would be beneficial to have full ignition system redundancy with two matching (duplicated) ignition systems for a heavy fuel UAV engine, the added weight of the complete second system would be too detrimental to performance and the effect on cost would also be an issue. An ignition system along these lines which includes two standard ignition systems, one serving as a primary system, and one for backup/redundancy purposes, would make for an uncompetitive overall engine package.

With the aforementioned in mind, it is desirable for the present invention to provide an ignition system for a UAV that provides ignition system redundancy capability but alleviates the problem of adding significantly to the weight (and cost) of the UAV.

The known means of achieving redundancy involves direct duplication of parts, as is required by civil aviation authorities for many aircraft systems. However, duplication of parts is in conflict with the requirement to keep weight to a minimum. Accordingly, a "partially" redundant ignition system is proposed, which fulfils the need for operational redundancy without incurring a significant weight (and cost) penalty incurred by such direct duplication.

SUMMARY OF THE INVENTION

In one aspect the present invention provides an ignition system for a spark ignited engine for a UAV, the ignition system including a primary ignition system and a secondary ignition system, the primary ignition system providing an ignition spark of a first spark energy and/or duration for combustion of a fuel-air mixture during normal operating conditions of the engine, the secondary ignition system providing an ignition spark of a second spark energy and/or duration to ignite the fuel-air mixture in the event that the primary ignition system is inoperative or partially operative, wherein the second spark energy or duration is less than the respective first spark energy or duration.

A further aspect of the present invention provides an ignition system for a spark ignited engine for a UAV, the ignition system including a primary ignition system and a secondary ignition system, the primary ignition system providing an ignition spark of a first spark energy and/or duration for combustion of a fuel-air mixture during normal operating conditions of the engine, the secondary ignition system providing an ignition spark of a second spark energy and/or duration to ignite the fuel-air mixture in the event that the primary ignition system is inoperative or partially operative, wherein the capability of the secondary ignition system is limited to provide the second spark energy or duration to be less than the respective first spark energy or duration of the primary ignition system.

It will be appreciated that a secondary ignition system of lesser capability than a primary ignition system for an engine, and one for an engine of a UAV, is particularly suited for use for redundancy purposes. Such lesser capability can be in the secondary ignition system:

having lower spark energy capacity than the primary ignition system; and/or providing a spark of reduced duration compared with spark duration of the primary ignition system.

For example, it is possible for a capacitive discharge (CD or CDI) secondary ignition system to have the same energy capacity as an inductive type primary ignition system, but in contrast deliver a shorter spark duration (e.g. 50 μs) than the inductive ignition system (e.g. 1~2 ms). Hence, the primary and secondary ignition systems of one or more embodiments of the present invention can have the same spark energy but very different spark durations on a DI engine.

Alternatively, the secondary ignition system (e.g. a radio-controlled (RC) CD ignition system) may have a lower energy rating than the primary ignition system (e.g. inductive ignition system). For example, the spark energy capability of the primary ignition system for a DI engine may be 50~100 mJ whereas the secondary ignition system may have a spark energy capability of <20 mJ.

Further alternatively, a combination of a lower spark energy rated secondary ignition system and shorter spark duration capability secondary ignition system compared with the primary ignition system may be employed.

During a limp-home or return-to-base mode of operation, the engine can be controlled such that the redundant system does not need to cope with all of the operational windows typical of normal engine operation.

Furthermore, it is important to understand and appreciate that a less capable redundant ignition system according to at least one embodiment of the present invention reduces cost, weight and packaging (size and fitment within the confines of a UAV engine housing) for certain UAV solutions.

At least one embodiment of the present invention is further distinguished over known systems in that engine operation can be shifted from one mode to another to facilitate satisfactory engine running during a limp-home or return-to-base mode of operation when ignition is being provided by the secondary/redundant ignition system.

According to one or more preferred embodiments of the present invention, engine operation can be shifted from stratified charge (i.e. lean-burn) running to homogenous charge operation (i.e. by shifting fuelling and ignition timing) to ensure combustion is able to be initiated by a spark of weaker/lesser spark energy produced by the secondary ignition system.

Advantageously, by specifying lower spark energy for the secondary ignition system compared to that of the primary ignition system, the secondary ignition system can utilise lighter ignition system components, thereby beneficially reducing the overall weight of the UAV for improved range and/or duration in the air.

More specifically, by reducing the spark energy requirement of the secondary system an ignition coil having a lighter core is able to be used and hence provide a desired weight saving.

It has also been realised that the secondary ignition system, as a back-up system to the primary ignition system, can be somewhat less robust than the primary system in terms of reduced physical size, and preferably reduced or limited total spark energy and/or duration per spark event, as the secondary ignition system is relied on far less often than the primary ignition system. That is, by trading-off some robustness, this provides a further opportunity to reduce the overall weight of the UAV.

Thus, for example, an ignition coil of the secondary ignition system (secondary ignition coil) may be less robust in terms of total energy delivery per spark and/or spark duration capacity in order to provide a sufficient limp-home or return-to-base capability, which may be supported or augmented by modified engine operating conditions which can tolerate such a spark with lesser spark energy and/or duration than otherwise provided by the primary ignition system.

It will be appreciated that a lower rated secondary ignition coil (as compared to a primary ignition coil) enables the provision of an overall ignition system with redundancy capability of smaller physical size and related packaging fit within the engine housing, and also reduces overall weight, cost and complexity of the ignition system compared with a fully replicated back-up ignition system of the prior art.

Alternatively, or in addition, a spark plug operated by the secondary ignition system may be physically smaller and/or have lower energy capacity rating across the spark gap than a spark plug operated by the primary ignition system.

It will be appreciated that one or more forms of the present invention may provide an ignition system combining a primary (higher spark energy and/or longer spark duration) ignition system (e.g. for lean-stratified combustion), with a secondary (lower spark energy and/or spark duration) lower performance, lighter weight, ignition system for redundancy capability applicable to UAVs, where high importance is placed on both reliability and weight.

The primary ignition system is capable of producing spark energy and/or spark duration sufficient to ignite the fuel-air mixture during all normal operating conditions, such as at start-up, under high load, at high RPM and during lean burn conditions including stratified lean burn, which typically have high spark energy and/or spark duration requirements.

When the primary ignition system is working correctly, the engine is able to operate within specification, without the need of the secondary ignition system. Preferably the secondary ignition system is utilised when the primary ignition system has a fault or has failed.

When the primary ignition system fails, the secondary ignition system can completely take over the fuel-air mixture ignition sparking, but at lower spark energy and/or shorter spark duration than the primary system, and therefore restricting the engine to lower performance conditions.

Thus, the secondary ignition system of the present invention provides sufficient spark energy and/or spark duration to maintain fuel-air mixture ignition under a limited range of engine operating conditions compared with the primary ignition system. However, the limited range of engine operating conditions is sufficient to keep the UAV flying, and preferably have it return to base/point of origin for servicing/rectification.

Since the spark energy and/or spark duration of the secondary ignition system is less than that of the primary ignition system, only partial ignition system redundancy is provided. However, the secondary ignition system is lighter and cheaper than a duplicate primary ignition system, and therefore keeps the added weight and cost down to provide a level of redundancy within acceptable parameters, thereby maintaining competitiveness of the overall ignition system and associated engine package.

As an example, the primary ignition system may include an inductive coil weighing 407g, whilst the secondary ignition system may utilise a capacitive discharge coil weighing 110g. When the overall engine package for a UAV may be in the realm of 1.7-1.8 kg, it can be appreciated how significant this level of weight saving can be.

Detecting failure of the primary ignition system in a timely manner can however in certain circumstances present a challenge. If the Engine Control Unit (ECU) control strategy waits until complete failure of the primary ignition system is confirmed, before actuating the secondary ignition system, there is a real risk that the engine may stall in the meantime. The secondary ignition system may then not have sufficient spark energy and/or spark duration to restart the engine even if restarting is an option.

An alternative may therefore be to actuate the secondary ignition system even when the primary ignition system is operating. Thus, in the event of failure of the primary ignition system, the secondary ignition system can prevent the engine from stalling even before the ECU has detected the failure of the primary ignition system.

It has been realised that operating the primary and secondary ignition sparking together during normal engine operation may have a detrimental effect on fuel-air combustion characteristics if the primary ignition system is working normally. For example, if secondary sparking occurs before the primary sparking or if the flame front after primary sparking has not had time to propagate sufficiently before secondary sparking, combustion characteristics can be affected, possibly leading to poor fuel economy, lower power or engine combustion instability and therefore reduced engine performance.

The secondary ignition sparking can therefore preferably be retarded in time with respect to the primary ignition sparking. Thus, the secondary sparking can occur after the primary flame front has spread through the combustion chamber. Operation in this manner alleviates any detrimental affect the secondary ignition sparking might have on normal combustion and engine operation.

Should the flame front fail because of failure of the primary ignition system, the secondary ignition system (which can already be intermittently or continuously sparking when the primary ignition system fails) will ignite the fuel-air mixture to initiate the flame front.

It will be appreciated that, if the secondary ignition sparking is retarded with respect to the primary ignition sparking, and the primary ignition sparking has failed, initiation of the flame front will be delayed from normal operation for a period of time. However, once the ECU detects that the primary ignition system has failed, ignition timing modification may be initiated.

That is, when the primary ignition system is functional, sparking of the secondary ignition system is delayed such that the secondary ignition sparking does not affect the formation of the flame front within the combustion chamber. However, once failure of the primary ignition system has been detected, the delay on the secondary spark can be eliminated if desired, and ignition timing correction can be effected whereby the timing of the secondary ignition sparking is advanced.

Preferably, such ignition advancement may be used to effectively bring the timing of the secondary ignition spark forward to that of what would be the timing of the primary ignition spark, or to timing between the initial secondary ignition spark timing and what would be the primary ignition spark timing.

It should also be noted however that once failure of the primary ignition system has been detected the engine may, as a result, be put into a safe operating state known as 'limp home' mode. Operation in limp home mode typically utilises or requires a late (retarded) spark and so it may be determined to maintain a retarded timing for secondary ignition sparking.

Accordingly, the timing of the secondary ignition spark may be advanced or retarded depending on specific or desired engine operating requirements and prevailing conditions.

Modification of the secondary ignition spark timing can achieve more optimal combustion than leaving the secondary ignition spark timing at a timing position prevailing prior to the primary ignition system failing.

As introduced above, the secondary ignition system may provide sufficient spark energy to maintain the engine running in a 'limp home' mode of operation. In a limp home mode, the engine has sufficient power and ability to keep running under moderate loads to get the UAV back to base or point of origin, but typically not to operate under very high RPM, high loads or extreme lean fuel-air mixture conditions. Consequently, preferably a simplified ignition strategy and fuel-air mixture strategy may be employed. The fuel-air mixture may be maintained within a rich to stoichiometric range, or preferably have excursions into just weak of stoichiometric for periods of operation.

Preferably fuelling to the engine is also modified once the primary ignition system has failed. More preferably, the level of fuelling is modified to match the spark energy from the secondary ignition system. Although lower engine power will usually be experienced under such fuelling and ignition strategy, the engine will have sufficient power to maintain flight to return the UAV to base/point of origin.

Preferably the ignition system utilises a twin spark plug per cylinder arrangement, with a first spark plug for the primary ignition system and a second spark plug for the secondary ignition system.

A further aspect of the present invention provides a method of controlling spark ignition in an engine for a UAV, the engine including an ignition system with a primary ignition system and a secondary ignition system, the primary ignition system providing ignition sparking of a first spark energy and/or spark duration for combustion of a fuel-air mixture during normal operating conditions of the engine, the secondary ignition system providing ignition sparking of a second spark energy and/or spark duration to ignite the fuel-air mixture in the event that the primary ignition system is inoperative or partially operative, wherein the secondary ignition system provides the second spark energy and/or spark duration less than the respective first spark energy or spark duration of the primary ignition system.

Thus, advantageously, by only requiring lower spark energy and/or shorter spark duration from the secondary ignition system compared to that of the primary ignition system, the secondary ignition system can utilise lighter, less robust, ignition system components, thereby saving weight.

The method may include detecting failure or partial failure of the primary ignition system. For example, an ECU may detect or receive a signal that a low voltage side of an inductive ignition coil has failed or is failing, and as a result modify or commence sparking and/or spark timing of the secondary ignition system. Thus, the secondary ignition system may be initiated following detection of failure or partial failure of the primary ignition system and/or may advance the timing of the secondary ignition system sparking.

Preferably the primary ignition system and the secondary ignition system may be operated continuously during operation of the engine (sparking can be occurring intermittently, periodically or continuously during such operation). This avoids the need to initiate sparking by the secondary ignition system and thereby avoids delays in maintaining ignition and therefore helps to reduce the risk of engine stall.

The method may include operating the primary and secondary ignition system sparking during normal engine operation, with the secondary ignition sparking retarded in time with respect to the primary ignition sparking and occurring after a primary flame front has spread through a respective combustion chamber.

Preferably a fuelling strategy to the at least one cylinder of the engine may be modified when the secondary ignition system is relied upon for fuel-air ignition. Such fuelling strategy modification may include maintaining a fuel-air ratio between stoichiometric while the secondary ignition system is maintaining combustion ignition for the engine.

A further aspect of the present invention provides a UAV spark ignition engine including an ignition system according to one or more embodiments of the ignition system described herein.

Furthermore, another aspect of the present invention provides a UAV spark ignition engine controlled using a method according to any one of the methods for ignition described herein.

A still further aspect of the present invention provides a UAV spark ignition engine including a fuel delivery system delivering heavy fuel into at least one combustion chamber of the engine and incorporating an ignition system and/or a method of controlling an ignition system, according to one or more embodiments described herein.

BRIEF DESCRIPTION OF THE DRAWINGS

One or more embodiments of the present invention will hereinafter be described with reference to the accompanying figures, in which.

DESCRIPTION OF PREFERRED EMBODIMENT

Figure 1:
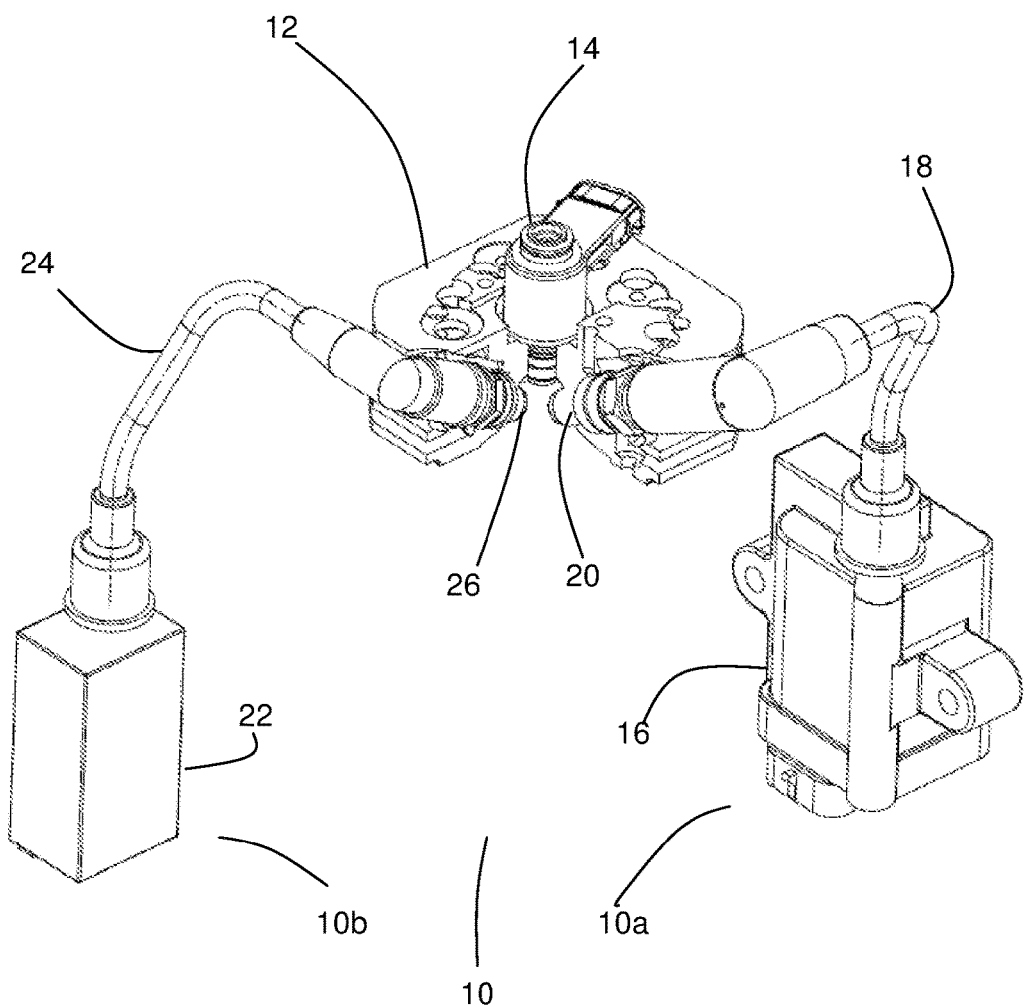
FIG. 1 shows a general arrangement of an ignition system for a spark ignited engine for a UAV, the ignition system including a primary ignition system and a secondary ignition system, each connected to a respective spark plug in a cylinder head of the engine, according to an embodiment of the present invention.

FIG. 1 shows an embodiment of an ignition system 10 of the present invention.

A cylinder head 12 of a UAV engine has mounted to it a delivery injector 14 and two spark plugs 20, 26.

The ignition system 10 includes primary 10a and secondary 10b ignition systems.

The primary ignition system 10a includes a primary ignition unit 16 electrically connected via a high tension (HT) lead 18 to one of the two spark plugs 20.

The primary ignition unit 16 converts low voltage (low tension) pulses to high voltage (HT) pulses. The HT pulses result in primary sparking at the respective spark plug 20.

The primary ignition unit 16 includes an inductive coil having an iron core. Such inductive coils are reliable and produce high power sparking over a short period of time.

The secondary ignition system 10b includes a secondary ignition unit 22 connected via a second high tension lead 24 to the second spark plug 26.

In the embodiment described the secondary ignition unit 22 includes a capacitor discharge device providing lower power sparking than the higher capacity inductive coil of the primary ignition unit. Thus, a weaker spark and/or shorter duration spark is produced by the secondary ignition system.

It will be appreciated that the secondary ignition system is lighter than the primary system, requiring no heavy iron cored inductive coil. This alleviates the problems associated with adding additional weight to a UAV. Duplicating the heavy iron cored inductive coil in a secondary ignition system would increase the overall weight of the UAV to the detriment of performance and range (endurance) of the UAV, as well as potentially cost.

However, not providing a secondary ignition system would result in potential loss of the UAV if the primary ignition system fails and may not meet certain regulatory requirements in terms of redundancy capability for specific applications. Consequently, providing the lighter weight secondary ignition system is a worthwhile and acceptable compromise to provide a 'get you home' functionality to the UAV at lower performance whilst keeping the UAV competitive on cost and satisfying redundancy capability requirements.

Figure 2:
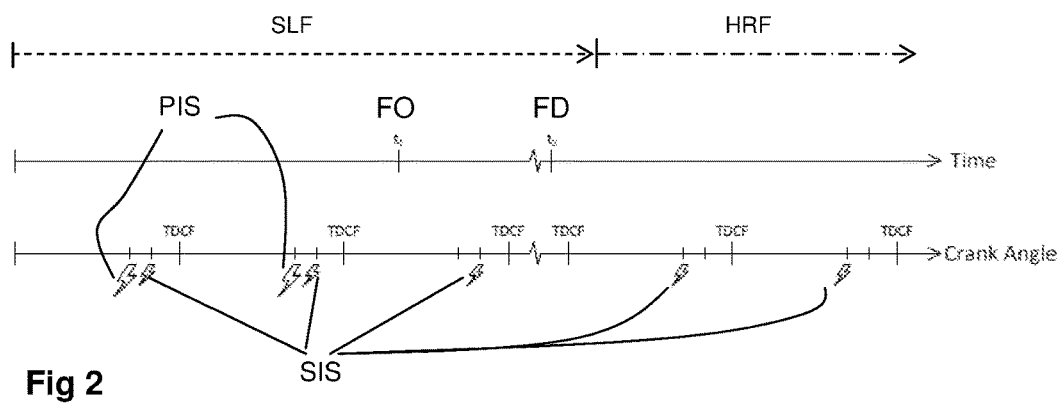
FIG. 2 shows a chart representing spark timing for the primary and secondary ignition system when the primary ignition system fails, according to an embodiment of the present invention.

FIG. 2 shows an example of the primary ignition spark (PIS) occurring normally in advance of the secondary ignition spark (SIS). The PIS occurs a few degrees before top dead centre of the engine's firing stroke (TDCF).

The SIS also occurs a few degrees before top dead centre of the engine's firing stroke (TDCF), though it is not as advanced as the timing of the PIS.

Up until time $t_1$, both the primary and secondary ignition systems are operational and their respective spark plugs are sparking. The secondary ignition spark SIS is retarded with respect to the primary ignition spark such that the flame front is created by the primary ignition spark PIS following ignition of the fuel and air mixture within the combustion chamber (not shown).

At or soon after time $t_1$ in FIG. 2, the primary ignition system fails—Failure Occurs (FO). Combustion continues to be initiated from the secondary ignition spark SIS, though with sub-optimal ignition timing because of the now effectively retarded ignition spark.

Thus, in the embodiment shown in FIG. 2, at or some time between time $t_1$ and time $t_2$ in FIG. 2, the Electronic Control Unit (ECU) of the engine that also controls timing of ignition pulses to the spark plugs, detects the failure of the primary ignition system—Failure Detected (FD) (such as a failure of the primary ignition coil). The ECU then adjusts timing of the secondary ignition spark by advancing that sparking towards or to the original ignition timing associated with the primary ignition sparking.

The crank angle trace in FIG. 2 shows the secondary ignition spark (SIS) being advanced from $t_2$ from its original retarded ignition timing to a more advanced ignition timing. This adjustment of the timing helps to stabilise combustion, and may additionally help to maintain fuel economy and engine performance.

It is preferred that the engine operates using a stratified, leaner fuelling (SLF) charge during engine operation when the primary ignition system is working normally e.g. up to time $t_1$ in FIG. 2. If the primary ignition system develops a fault or fails e.g. at or after time $t_1$, the fuelling strategy preferably quickly, and ideally immediately in time for a subsequent (preferably the next) combustion cycle, transitions to a homogenous, richer fuelling (HRF) charge for combustion cycles occurring by or after time $t_2$ onwards.

If the engine is operating in the lean, stratified, combustion region (low/medium load) and the primary ignition system develops a suspected fault (such as a faulty primary ignition coil), fuelling can be shifted to a richer mixture. This shift preferably occurs on the next injection event (i.e. as soon as possible after the fault is detected) to avoid the possibility of the lower energy and/or shorter spark duration capacity secondary ignition coil in the secondary ignition system failing to ignite the currently lean mixture with a retarded ignition timing and potentially resulting in an engine stall situation.

A fuelling shift from a stratified leaner charge (SLF) to a homogenous richer charge (HRF) (stoichiometric or richer) can be employed when the fault in the primary ignition system is detected in order to ensure the lower energy and/or shorter duration retarded spark provided by the secondary ignition system can ignite the mixture within the cylinder for this next combustion event.

Where the secondary ignition system is a capacitive discharge ignition system (CDI system), which provides a significant weight reduction of the secondary system as compared to the primary system, the long spark duration of the primary ignition system is no longer available to assure overlap of the fuel delivery event and the spark event for reliable combustion in stratified fuelling mode. In such a situation, the shift to a homogeneous fuelling mode is preferred to maintain the expectancy of igniting the air-fuel mixture within the cylinder.

Figure 3:
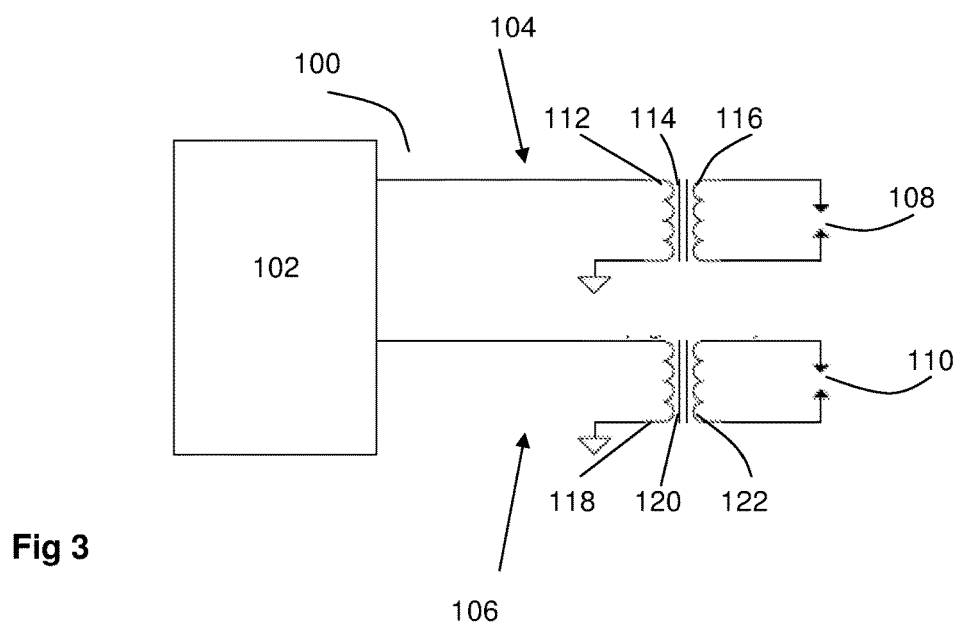
FIG. 3 shows a general schematic of the primary and secondary ignition systems connected to an electronic control unit (ECU), according to an embodiment of the present invention.

FIG. 3 shows a general schematic of an ignition system 100 according to an embodiment of the present invention. An ECU 102 is connected electrically to primary 104 and secondary 106 ignition systems. Normal operation of the engine relies on the primary ignition system 104. If the primary ignition system fails or has a fault, the secondary ignition system 106 can take over ignition. The ECU can have the ability to detect failure or a fault in the primary ignition system.

The ECU can have the following failure detection capabilities (preferably implemented in hardware):
  Open load detection (e.g. determine if ECU is connected to primary ignition coil);
  Short-to-battery detection (e.g. determine if wire between ECU and coil has become shorted to battery); and/or
  Short-to-ground detection (e.g. determine if wire between ECU and coil has become shorted to Ground).

Further failure detection strategies can be implemented in software. For example: if the engine starts running poorly, then the ECU can assume that the primary ignition has failed and can confirm this assumption by adjusting the primary timing and observing the resulting effect (if any).

An ignition coil 114 includes a low voltage supply side 112.

Failure detection can also include the ECU determining poor or no sparking at the spark plug terminals 108 via the high tension side 116.

In the event that the primary ignition system 104 fails or is faulty, the secondary ignition system 106 can already be sparking. As mentioned above, the secondary ignition system can be sparking with retarded spark timing whilst the primary system is operating normally. The secondary ignition system can include a low voltage side 118 connected to the ECU, a voltage transformer 120, preferably a lightweight, capacitor type transformer, and a high voltage side 122 connected to the terminals 110 of the second spark plug.

Figure 4:
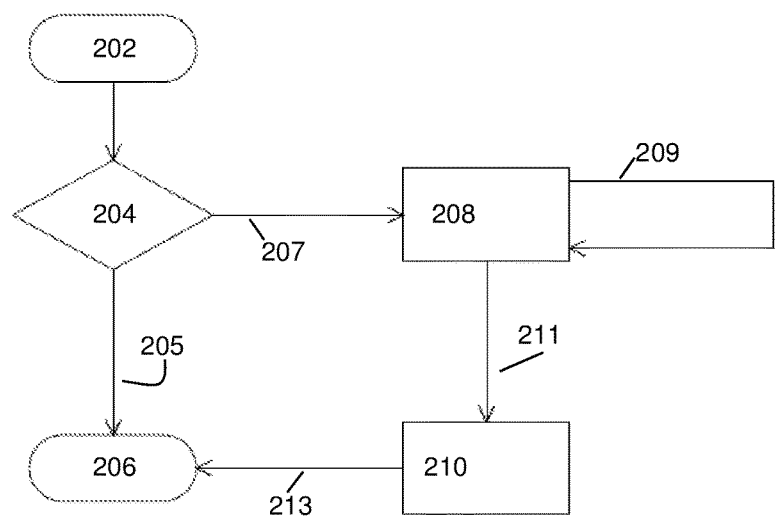
FIG. 4 shows an operational logic flow chart relating to an embodiment of the present invention.

FIG. 4 shows a logic flow chart giving an example of ignition systems operation and checking from start-up to cessation of operation. When an engine of the UAV is to be started 202, an ignition systems check 204 is carried out. The UAV would preferably not be allowed to take-off if the ignition systems check reveals 205 that one or other of the primary and secondary ignition systems has failed or is faulty before take-off.

If the primary and secondary ignition systems are operating 207, the ECU is aware of a normal ignition systems operating mode 208. The UAV is allowed to take-off. A continual check 209 is made of the operation of at least the primary ignition system to make sure it is operating normally.

If a fault or failure of the primary ignition system is detected 211, the secondary ignition system is relied upon to maintain ignition in order for the UAV to return 'home' to base or to a directed location. Thus, the UAV is in a 'limp home' mode with the secondary ignition system providing ignition. Depending on specific or desired operating engine operating conditions, the timing of the secondary ignition system sparking may be advanced to match or be closer to that of the original ignition timing of the primary ignition system, or potentially retarded such that later secondary spark timing may be maintained during such limp home mode operation. The UAV is then directed or controlled to return to base 213.

Preferably the ECU has the ability to detect failure of the primary ignition system, such as by detecting a weak or no primary ignition pulse on the low tension side or on the high tension side.

Alternatively, the ECU may be controlled remotely, such as by an operator using wireless remote control, to commence/initiate operation of the secondary ignition system if it is not already operating and/or to advance timing of the secondary ignition spark to maintain combustion within a desired or acceptable specification.

It will be appreciated that the present invention provides a relatively lightweight secondary ignition system giving partial ignition system redundancy should the primary ignition system fail.

The present invention beneficially overcomes the significant weight increase (and therefore the associated financial cost of the more robust components, reduced fuel economy, reduced range and overall performance of the vehicle), that would otherwise come with full redundancy through duplicating the primary ignition system, whilst maintaining an operational 'back-up' ignition system at least sufficient for the vehicle to return to base or to reach a safe location to avoid the potential complete loss of the vehicle.

The invention claimed is:

1. An ignition system for a spark ignited engine of an unmanned aerial vehicle (UAV), the ignition system including a primary ignition system and a secondary ignition system, the primary ignition system configured to provide an ignition spark of a first spark energy or spark duration to at least one first spark plug for combustion of a fuel-air mixture during operation of the engine, the secondary ignition system configured to provide an ignition spark of a second spark energy or spark duration to the at least one first spark plug or to at least one second spark plug to ignite the fuel-air mixture in the event that the primary ignition system is inoperative or partially operative, wherein the second spark energy or spark duration being provided by the secondary ignition system is less than the respective first spark energy or spark duration being provided by the primary ignition system.

2. The ignition system of claim 1, wherein the primary ignition system includes an inductive coil and the secondary ignition system includes a capacitive discharge coil.

3. The ignition system of claim 1, wherein the primary ignition system includes the at least one first spark plug and the secondary ignition system includes the at least one second spark plug.

4. The ignition system of claim 1, connected to an electronic control unit (ECU) controlling operation of an engine.

5. The ignition system of claim 4, wherein the ECU further is in communication with or includes detection means arranged and configured to detect failure or partial failure of the primary ignition system.

6. The ignition system of claim 4, wherein the ECU is configured to operate the engine in a lean burn combustion mode and to adjust one or both of the ignition timing and the fuel injection timing from said lean burn combustion mode towards a stoichiometric, rich or homogenous combustion mode when ignition is provided by the lower capability secondary ignition system.

7. A method of controlling spark ignition in an engine of an unmanned aerial vehicle (UAV), the engine including an ignition system with a primary ignition system and a secondary ignition system, the primary ignition system providing ignition sparking of a first spark energy or spark duration to at least one first spark plug for combustion of a fuel-air mixture during operation of the engine, the secondary ignition system providing ignition sparking of a second spark energy or spark duration to the at least one first spark plug or to at least one second spark plug to ignite the fuel-air mixture in the event that the primary ignition system is inoperative or partially operative, wherein the secondary ignition system provides one or both of: (a) the second spark energy at a lower spark energy, and (b) the second spark duration at a shorter spark duration than the respective first spark energy or spark duration of the primary ignition system.

8. The method of claim 7, including detecting failure or partial failure of the primary ignition system.

9. The method of claim 7, whereby the primary ignition system and the secondary ignition system operate continuously during operation of the engine until the primary ignition system is inoperative or partially operative, and whereby the secondary ignition system maintains one or both of: (a) said second spark energy at a lower spark energy, and (b) the second spark duration for said combustion of the fuel-air mixture.

10. The method of claim 7, whereby the secondary ignition system commences operation following detection of failure or partial failure of the primary ignition system.

11. The method of claim 9, whereby the secondary ignition system sparking occurs retarded relative to the primary ignition sparking.

12. The method of claim 7, further including modifying timing of the secondary ignition system sparking if failure or partial failure of the primary ignition system sparking is detected.

13. The method of claim 12, further including advancing spark timing of the secondary ignition system sparking.

14. The method of claim 7, further including providing retarded spark timing of the secondary ignition system sparking during a limp home mode of operation.

15. The method of claim 7, further including operating an electronic control unit (ECU) to commence sparking or to modify spark timing of the secondary ignition system if a low voltage signal of the primary ignition system is at or below a threshold value.

16. The method of claim 7, further including operating the primary and the secondary ignition system providing sparking during engine operation until the primary ignition system is inoperative or partially operative, whereby the secondary ignition system maintains one or both of: (a) said second spark energy at a lower spark energy, and (b) the second spark duration for said combustion of the fuel-air mixture, the secondary ignition sparking being retarded in time, when the primary and the secondary ignition systems are both providing sparking, with respect to the primary ignition sparking and occurring after a primary flame front has spread through a respective combustion chamber.

17. The method of claim 7, further including modifying the fuelling strategy when the secondary ignition system is relied upon for ignition of the fuel-air mixture.

18. The method of claim 17, further including maintaining a fuel-air ratio between stoichiometric and rich.

19. The method of claim 16, further including maintaining a fuel-air ratio between stoichiometric and rich.

20. The method of claim 17, further including operating the engine with a lean burn combustion mode, and adjusting one or both of the ignition timing and the fuel injection timing from said lean burn combustion mode towards a stoichiometric, rich or homogenous combustion mode when ignition is provided by the secondary ignition system.

21. An unmanned aerial vehicle (UAV) spark ignition engine including an ignition system according to claim 1.

22. The UAV spark ignition engine of claim 21, further including a fuel delivery system delivering heavy fuel into at least one combustion chamber of the engine.

23. An unmanned aerial vehicle (UAV) spark ignition engine controlled using a method according to claim 7.

24. The UAV spark ignition engine of claim 23, further including a fuel delivery system delivering heavy fuel into at least one combustion chamber of the engine.

* * * * *